(12) United States Patent
Sirigiri et al.

(10) Patent No.: US 8,126,015 B2
(45) Date of Patent: Feb. 28, 2012

(54) MULTI-STREAM COMMUNICATION PROCESSING

(75) Inventors: Anil Kumar Reddy Sirigiri, Kamataka (IN); Chaitra Maraliga Ramaiah, Kamataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 261 days.

(21) Appl. No.: 12/138,985

(22) Filed: Jun. 13, 2008

(65) Prior Publication Data
US 2009/0257450 A1    Oct. 15, 2009

(30) Foreign Application Priority Data
Apr. 11, 2008  (IN) .............................. 920/CHE/2008

(51) Int. Cl.
*H04J 3/22* (2006.01)
(52) U.S. Cl. ........................................ 370/474; 709/201
(58) Field of Classification Search .................. 370/464, 370/474; 709/201
See application file for complete search history.

(56) References Cited

U.S. PATENT DOCUMENTS
6,795,546 B2    9/2004  Delaney et al.
(Continued)

OTHER PUBLICATIONS
C. Casetti and W. Gaiotto, Westwood SCTP: load balancing over multipaths using bandwidth-aware source scheduling, "Vehicular Technology Conference, 2004.VTC2004-Fall.2004 IEEE 60th," Publication Date Sep. 26, 2004, vol. 4, pp. 3025-3029.
(Continued)

*Primary Examiner* — Hassan Kizou
*Assistant Examiner* — Charles C Jiang

(57) ABSTRACT

The processing of multi-streaming communication includes an association between a sender and a receiver established over a communications network. The processing also includes identifying each of more than one independent multi-streamed messages transferred over the association. Each of the multi-streamed messages are separated at the receiver, and each separated message is processed in parallel with the other messages on a corresponding unique processor at the receiver.

14 Claims, 2 Drawing Sheets

U.S. PATENT DOCUMENTS

| | | | |
|---|---|---|---|
| 7,564,835 B1* | 7/2009 | Grabelsky et al. | 370/352 |
| 2003/0120716 A1* | 6/2003 | McClellan et al. | 709/201 |
| 2004/0096049 A1* | 5/2004 | Delaney et al. | 379/229 |
| 2005/0286526 A1* | 12/2005 | Sood et al. | 370/394 |
| 2006/0002424 A1* | 1/2006 | Gadde | 370/469 |
| 2006/0072562 A1* | 4/2006 | King | 370/389 |

OTHER PUBLICATIONS

C. Casetti and W. Gaiotto, "Westwood SCTP: load balancing over multipaths using bandwidth-aware source scheduling", CERCOM—Dipartimento di Elettronica, Politecnico di Torino, Torino, Italy, IEEE 2004.

Zou, M. Umit Uyar, Mariusz A. Fecko and Sunil Samtani, "Throughput models for SCTP with parallel subflows", Computer Networks 50 (2006) 2160-2182, Jan. 22, 2007.

Saurabh Baji and Vishwas Bhat, "Improving Throughput at the Transport Layer through Multihoming using SCTP", Department of Computer Sciences, University of Texas at Austin; Feb. 19, 2005; http://wayback.archive.org/web/20050301000000*/http://www.cs.utexas.edui~vishwasidocuments/CMT.pdf.

* cited by examiner

MULTI-STREAM COMMUNICATION PROCESSING

CROSS-REFERENCE TO RELATED APPLICATIONS

This Utility Patent Application claims priority to Indian Patent Application No. IN 920/CHE/2008 filed on Apr. 11, 2008, which is incorporated herein by reference.

BACKGROUND

Telecommunication systems use protocols to communicate, and communication protocols are basically a set of rules to that are followed in order for the telecommunication system to operate properly. Telecommunications system can include various types of systems, and can include communications between electronic devices. Example of such systems can include telephony and computer networks, and particular examples include the Internet and Public Switched Telephone Networks (PSTN). The designs of such systems are often presented as reference models, which may include a set of layers used to describe the functions of the system. Common reference models include a transport layer, which can be an abstract description of the layer responsible for getting data from one location to another with a transport protocol. Transport protocols enable the connection, communication, and data transfer between two endpoints.

Several different examples of transport protocols exist, and are often selected based on their support of features. For example, a transport protocol can support features such as message-based multi-streaming where the transport protocol can transport multiple independent messages in parallel within the same connection, association, or the like. An example protocol is Stream Controlled Transmission Protocol, or SCTP. Multi-streaming is in contrast to transport protocols that deliver messages in a byte stream sequentially such as one message at a time or in on stream including several messages multiplexed together. Some particular examples of telecommunication systems that benefit from multi-streaming include the Internet, PSTN, SS7 (or SIGTRAN, CCSS7, and C7) and others.

In an example process of transferring messages includes several features. Connections or associations between end points are established, and messages are sent between a logical sender to a logical receiver via a transport protocol. Data in the messages is processed sequentially, or linearly, at the transport layer and then de-multiplexed into different streams based on a stream identifier carried in the message. The different streams are then delivered to their respective application threads.

A difficulty of multi-streaming is that the independent streams are processed in a sequential manner, which reduces or altogether negates the benefit of having parallel streams in a connection or an association. A multi-streaming protocol can give the notion of data arriving on different streams for application, but bottlenecks occur when the messages are processed linearly at the transport protocol level.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
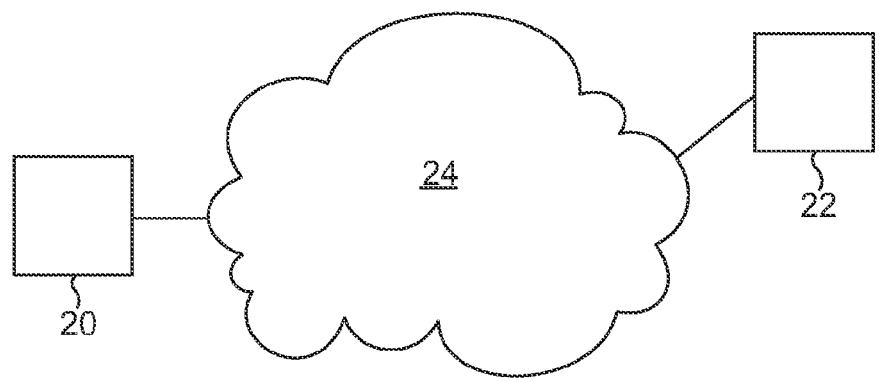
FIG. 1 is a schematic view of an example environment of the present disclosure.

FIG. 1 illustrates an example environment of the present disclosure. The environment includes at least two communication devices 20, 22 connected together with a communication network 24. The communication devices include a sender 20 and a receiver 22, although the communication devices can each be both a sender and a receiver. Another description is that the communication devices represent endpoints. In some examples, there can be multiple receivers connected together with the sender over the network. The communication devices can be any of a number of different types of devices and can include electronic communication devices. Examples of electronic devices include computers, some types of telephones, personal digital assistants (PDAs), tablets, and the like. There is no requirement that the sender and the receiver be the same type of communication device. The communication network 24 can be any one of a number of suitable networks that supports communication between the devices 20, 22. Example of such systems can include telephony and computer networks, and particular examples include the Internet and Public Switched Telephone Networks (PSTN). In order to facilitate communication over the network, at least one of the devices seeks out the other device (or more devices) and establishes a connection, or association, to communicate over the network 24. Communication, such as messages, can be passed between the devices of the connection.

The terms "connection" and "association" can at times in the art refer to something specific in the description of a particular transport protocol. For example, TCP (Transmission Control Protocol) establishes a "connection" feature between devices whereas SCTP (Stream Controlled Transmission Protocol) establishes an "association" feature between the devices. At some level of abstraction a "connection" is similar or analogous to an "association." This disclosure intends the use of these types of terms to be analogous and inclusive, and the terms are not intended to refer to any specific protocol unless specifically noted. Further, the term "association" can be similar or analogous to another word for this feature in transport protocols, or the like, currently known or to be later developed. Still further, use of connection or association in this disclosure is not necessarily intended to distinguish between "connection" and "connectionless" types of transport protocols unless otherwise noted. The disclosure is not intended to be limited to any particular example of transport protocol.

Instead, this disclosure is intended to encompass many different transport protocols, either currently known or later developed. In some of the described examples, the transport protocol supports the feature of multi-streaming such as where the transport protocol can transport multiple independent messages in parallel within the same connection, association, or the like. A particular example of such a transport protocol is SCTP, and many of the examples below are described in the context of SCTP. This disclosure is not limited to SCTP as the only suitable example of a transport protocol.

SCTP is an Internet Protocol (IP) transport protocol that exists on an equivalent level as TCP and provides transport layer functions to many Internet applications. SCTP provides a reliable transport service that ensures data is transmitted across a network without error and in sequence. SCTP supports a data exchange between the two endpoints 20, 24, although these endpoints can be represented by multiple IP addresses.

SCTP supports multi-streaming. Multi-streaming allows data to be partitioned into multiple streams that include the property of independently sequenced delivery. In many applications of SCTP, the characteristic of strict, rather than independent, sequence delivery is not critical, such as in certain features of telephony signaling. Multi-streaming also can be used to deliver multimedia documents that include items of different size and types. Multi-streaming allows delivery so that all streams are subjected to common flow and congestion control, which reduces overhead.

Figure 2:
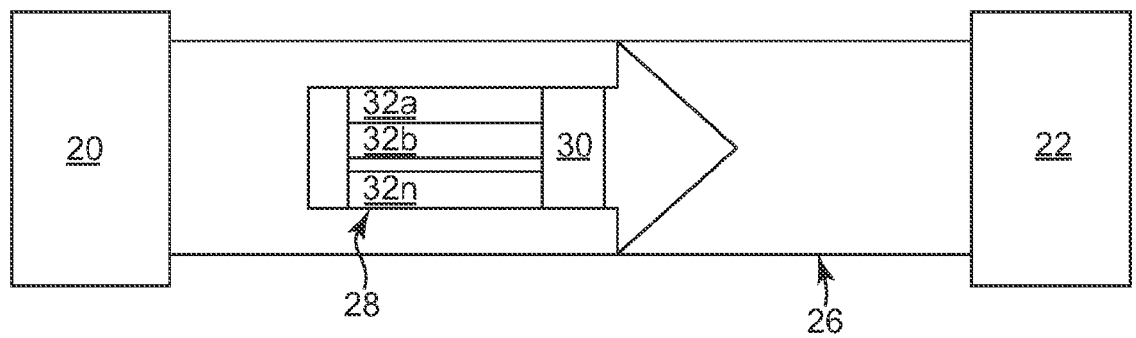
FIG. 2 is a schematic view of an example feature of the present disclosure.

FIG. 2 illustrates an example of a multi-streaming communication. In the example, an association 26 established between the endpoints 20, 22. A multi-streaming transmission or packet 28 is illustrated as carried on the association 26. In one example, the association can exist at the transport layer in that it can be a response to a service request from an application layer and issue a service request to a network layer, such as Internet Protocol. The packet 28 carries with it a plurality of stream identifiers 30 and an equal number of messages or streams 32a-32n. Each stream identifier corresponds with an independent stream 32a, 32b, . . . or 32n.

In one example, the example illustrated in FIG. 2 can represent an association in SCTP. The association includes one or more IP addresses for a particular port at each end point, which provides a redundancy with respect to link or path failures. The protocol data unit in SCTP is an SCTP packet. An SCTP packet includes a header and at least one chunk. Multiple chunks are possible. A chunk can include control information, user data (payload), or both. The stream identifiers and the corresponding streams are coupled together in a chunk.

Figure 3:
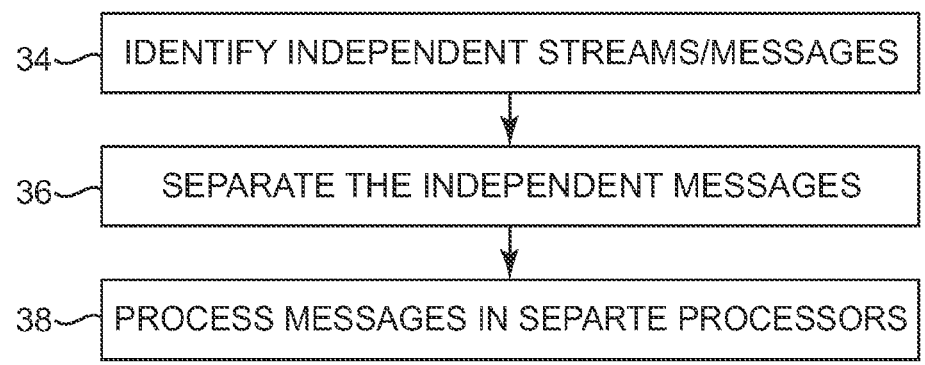
FIG. 3 is a flow chart of an example of the present disclosure.

FIG. 3 illustrates a method for processing the multi-streaming communication of FIG. 2. The independent multi-streamed messages 32a-32n that are transferred in the association 26 are identified 34, for example at the receiver 22. In one example, the stream identifier 30 is used as an identification of the corresponding stream. Within this example, the stream identifier can be different for each message, or just different for each message in the packet. In the case when SCTP is used as the transport protocol, the stream identifier included in the chunks can be read at the receiver to identify the corresponding payload. In cases where a stream identifier is not provided in the transport protocol, the method applies the protocols own method of identifying the messages.

FIG. 3 further illustrates that each of the identified independent messages at the receiver are separated 36. In the case where a stream identifier is provided, the messages corresponding with their stream identifiers are separated from each other. In one example of separating messages, the messages are parsed apart according to their stream identifier, and each message is assigned a different destination from the other messages. Once the independent messages are separated, each message can be processed separately in a corresponding unique processor 38. For example, each message is processed on its own processor, which is different from all of the other processors used to process the other messages in the packet.

Instead of processing each multi-streamed message linearly, the example of FIG. 3 separates each message and processes each message separately. In this example, parallel processing of a messages sent in parallel is achieved. This eliminates the bottle necks that occur when messages are processed in sequence and realizes the advantages of multi-streaming transport protocols.

Figure 4:
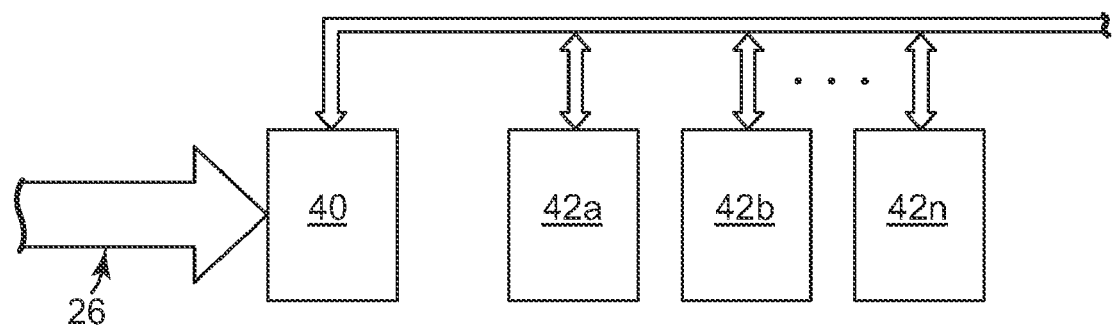
FIG. 4 is a schematic view of an example of the present disclosure.

FIG. 4 illustrates an example system for processing the multi-streaming communication illustrated in FIG. 2. This system can also be used to implement the method illustrated in FIG. 3. FIG. 4 includes a receiver processor 40, coupled in parallel with a plurality of additional processors 42a, 42b . . . 42n. The association is established with the receiver at the receiver processor 40. The receiver processor 40 is configured to receive the plurality of messages 32a-32n that are transferred and to separate the messages based on the corresponding identifier 30. In one example, the separated messages are processed on a corresponding and unique processor 42a-42n.

In an example, the receiver processor 40 separates the messages but does not process the messages, which is left to the plurality of processors 42a-42n. In this way, more efficiency is achieved in that the receiver process is relieved of any message processing duties that would interfere with or interrupt separating messages.

In an example, the stream identifier is assigned to a processor so that all processing of data related to the stream is performed with the same processor. Each stream identifier can be unique within the message or association so that no two separated streams are processed on the same processor. In this case, there are at least as many processors 42a-42n as there are independent streams 32a-32n. Even if there are more streams than processors, performance can still be improved over linear processing. The number of processors 42a-42n can be selected as at least as many as the maximum numbers allowed in the protocol or other system limitation (such as bandwidth). A further method would be to include at least as many processors as a statistical count of the messages in a packet, for example one standard deviation above the average or at least as many processors to cover all of the messages in 75% of the packets, and so on. Another method could be simply to select a number of processors, and so on.

In order to separate the messages, the receiving processor considers the stream identifiers, which can be used to identify the corresponding processor 42a-42n. The transfer protocol maintains the information in the packet that includes information as to what processor should be used for the stream. This could be done at the logical sender 20, where the sender could simply assign processor number without having to determine how many processors 42a-42n are included at the receiver 22. Once the identifier information is determined at the receiver processor, the receiver processor can apply a function to determine the appropriate processor. In one example, the function can take into consideration one or more of the stream identifier, the number of processors, a unique tag for each processor, and so on.

One particular example uses a hash function to generate the same processor tag for a given stream identifier. The hash function generates the tag identifier in a way such that the so that the receiver processor 40 is not selected to perform data processing. The following pseudo-code represents the logic of an example hash function:

$$\text{destination\_cpu} = (((\text{stream\_id})\% (\text{ncpus}-1)) + \text{niccpu}+1)\% \text{ ncpus}.$$

In this hash function, the "destination_cpu" is the identification of the processor assigned to perform the data processing as selected from the processors 42a-42n. The "stream_id" is the stream identifier. The designation "ncpus" is the number of processors at the receiver, such as the total number of available processors for data processing. The designation "niccpu" is the processor on which the messages have arrived. The "%" is understood in the art to represent the modulo operation, which determines a remainder in a division such as 18%4=2.

In some example, data structures related to the association can be regrouped to help accommodate the parallel processing. In one example of this, data structures related to an association control block, such as or similar to the Transport Control Block (TCB) set forth in the SCTP protocol specification RFC-2960, can be regrouped into two sets of data structures to avoid the overhead of different processors contending for the same data structures. The first set maintains data specific to a stream and is local to the processing of the stream, which often represents the large majority of data. The second set maintains common data applicable to more than one to all streams such as a peer's receive window, transport sequence number (TSN), which often represents only a few fields. Issues related to other processors accessing generic data is reduced because the independent stream processing maintains local data and because using dedicated processors. Access to the common data, however, can require synchronization (locks) of the data in a manner known in the art. But the benefits of parallelism with the disclosed examples clearly outweigh the cost, if any, of this synchronization or locks.

Examples can also support the multi-homing feature of transport protocols. Multi-homing describes the ability for a single endpoint to support multiple IP addresses. The benefit of multi-homing is the possibly of a greater likelihood of survivability of the session in the event of network failures. SCTP supports multi-homing.

Figure 5:
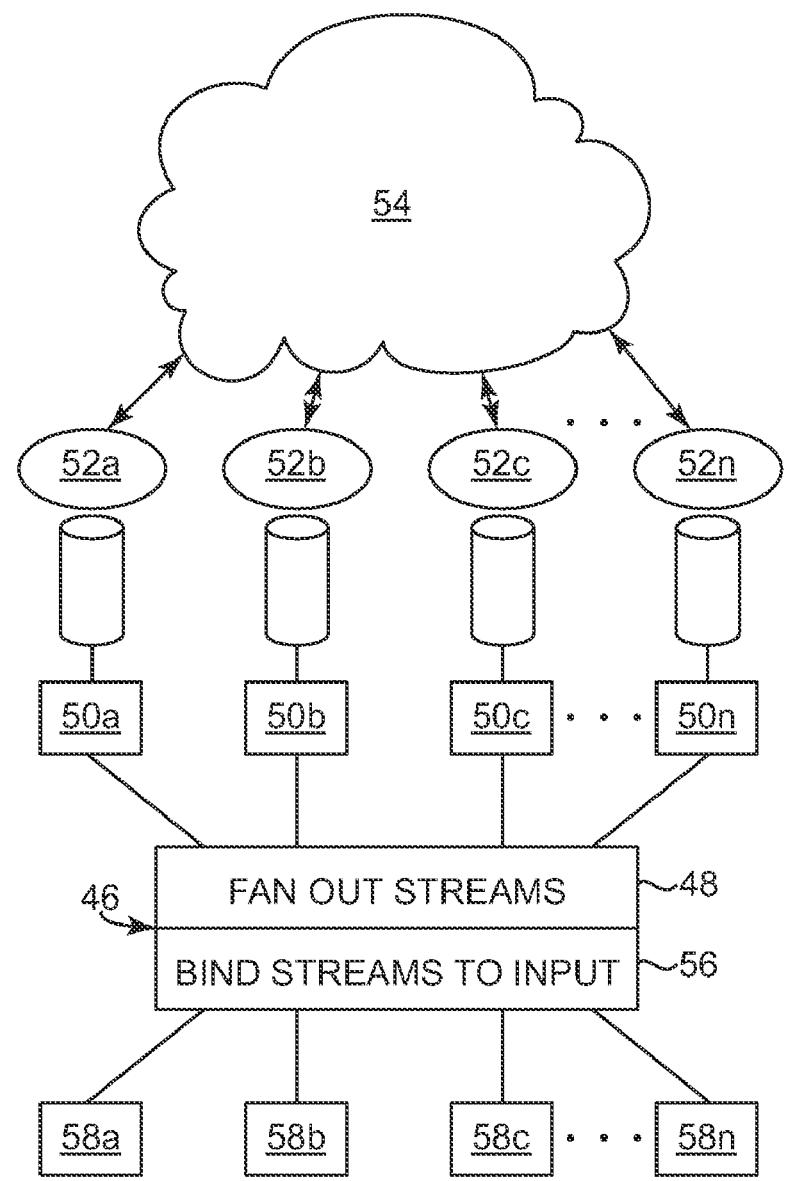
FIG. 5 is a schematic view of an example of the present disclosure.

FIG. 5 is a block diagram of a schematic view of a main software module operating in an example system at an endpoint. A core software module 46 includes a first function 48 that serves to fan out the different streams to the corresponding processors in parallel. The multiple processor/stream combinations 50a, 50b, 50c, . . . 50n process the data in parallel as corresponding threads 52a, 52b, 52c, . . . 52n that are coupled to an application main thread 54 common to the message. The core software module 46 also includes a second function 56 that serves to bind the stream identifiers to an input, such as a network interface controller 58a. In the case of multiple inputs 58b, 58c, . . . 58n, the second function 56 can also dynamically switch the inputs based on characteristics such as network congestion on different networks. The multi-homing feature discussed above can also provide a further level of parallelism, where two or more IP addresses can receive messages.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of processing multi-streaming communication at a communication receiver having a receiver processor and a plurality of message processors, the method comprising:
   identifying each of a plurality of independent multi-streamed messages by corresponding stream identifiers, wherein the multi-streamed messages are simultaneously carried together within a single payload, wherein the payload and the stream identifiers are carried together in a single packet, and wherein the packet is transferred over a communications network in an association between a sender and a receiver;
   separating each of the identified independent messages in the packet at the receiver processor based on the stream identifiers in the packet wherein each multi-streamed message includes a unique stream identifier;
   assigning the corresponding one of the unique processors for processing with a hash function on the stream identifier, which is $$\text{destination\_cpu} = (((\text{stream\_id})\% (\text{ncpus}-1)) + \text{niccpu}+1)\% \text{ ncpus};$$

wherein destination_cpu is the corresponding one of the unique processors,
   stream_id is the stream identifier,
   ncpus is the number of processors at the receiver,
   niccpu is the processor on which the messages have arrived, and
   % represents the modulo operation, which determines a remainder in a division; and
   simultaneously processing each of at least a plurality of separated independent message as an individual thread on a corresponding unique message processor at the receiver.

2. The method of claim 1 wherein the messages are transferred with a transport protocol operating in a transport layer.

3. The method of claim 2 wherein the transport protocol is Stream Controlled Transmission Protocol.

4. The method of claim 2 wherein processing each separated independent message is performed at the transport layer.

5. The method of claim 1 wherein the association includes at least one Internet Protocol address for a particular port at each of the sender and the receiver.

6. The method of claim 1 wherein the multi-streamed messages are grouped together in a packet and transferred on the association, and the stream identifier for each message is unique to the packet.

7. A system for processing multi-streaming communication from a sender having
   an association established between the sender and a receiver wherein the association includes a plurality of independent multi-streamed messages simultaneously transferred together as a single payload, wherein each of the messages includes an identifier, and wherein the payload and identifiers are included in a single message packet, the system comprising:
- a receiver processor configured to receive the plurality of messages transferred in the association and to separate the messages based on the corresponding identifier; and
- a plurality of message processors coupled in parallel to the receiver processor;
- wherein the receiver processor is configured to assign each of the messages in the association to a unique message processor according to a function performed on the identifier, and wherein the function includes:

destination_cpu=(((stream_id)%(ncpus−1))+niccpu+1)% ncpus;

wherein destination_cpu is the corresponding one of the unique processors,
stream_id is the identifier,
ncpus is the number of processors at the receiver,
niccpu is the processor on which the messages have arrived, and
% represents the modulo operation, which determines a remainder in a division; and
wherein the plurality of message processors are configured to simultaneously process the messages as individual threads.

8. The system of claim 7 wherein the plurality of message processors is at least as many as the plurality of messages in the association.

9. The system of claim 7 wherein only the plurality of message processors process the separated messages.

10. A non-transitory processor-readable medium tangibly storing processor-executable instructions to cause a processor to perform a method, comprising:
- receiving a plurality of independent multi-streamed messages each having corresponding stream identifiers, wherein the multi-streamed messages are simultaneously carried together within a single payload, wherein the payload and the stream identifiers are carried together in a single packet, and wherein the packet is transferred over a communications network in an association between a sender and a receiver
- separating each of the independent messages based on the stream identifiers in the packet wherein each multi-streamed message includes a unique stream identifier;
- assigning the corresponding one of the unique processors for processing with a hash function on the stream identifier, which is destination_cpu=(((stream_id)%(ncpus−1))+niccpu+1)% ncpus;

wherein destination_cpu is the corresponding one of the unique processors,
stream_id is the stream identifier,
ncpus is the number of processors at the receiver,
niccpu is the processor on which the messages have arrived, and
% represents the modulo operation, which determines a remainder in a division;
- simultaneously processing each of the messages as an individual thread along with the other messages; and
- binding each of the message identifiers to an input.

11. The non-transitory processor-readable medium of claim 10 wherein the processing includes processing the messages in parallel as corresponding threads that are coupled to an application main thread.

12. The non-transitory processor-readable medium of claim 10 wherein binding each of the stream identifiers to an input includes selecting one of a plurality of inputs for binding.

13. The non-transitory processor-readable medium of claim 12 wherein the selecting includes considering network congestion characteristics.

14. The non-transitory processor-readable medium of claim 12 wherein the messages are provided with a transport protocol that supports multi-homing.

\* \* \* \* \*